June 5, 1951     H. T. LAMBERT ET AL     2,555,651
DISK BRAKE FOR AUTOMOTIVE VEHICLES Filed April 13, 1948     5 Sheets—Sheet 1

INVENTORS
H. T. LAMBERT
C. R. MYERS
BY
ATTORNEYS

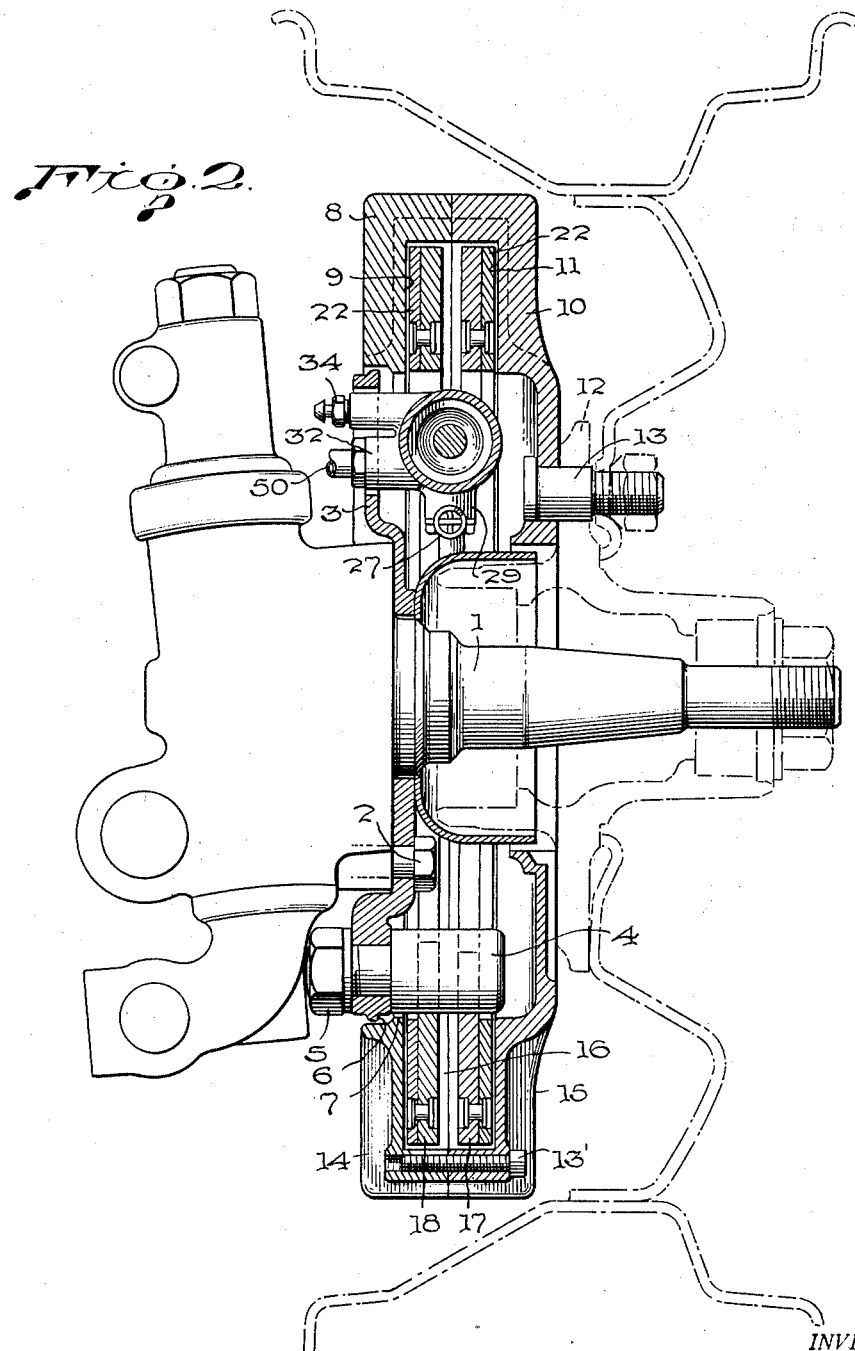

June 5, 1951 H. T. LAMBERT ET AL 2,555,651
DISK BRAKE FOR AUTOMOTIVE VEHICLES
Filed April 13, 1948 5 Sheets-Sheet 3

INVENTORS
H. T. LAMBERT
C. R. MYERS
BY
ATTORNEYS

June 5, 1951     H. T. LAMBERT ET AL     2,555,651
DISK BRAKE FOR AUTOMOTIVE VEHICLES
Filed April 13, 1948     5 Sheets-Sheet 5
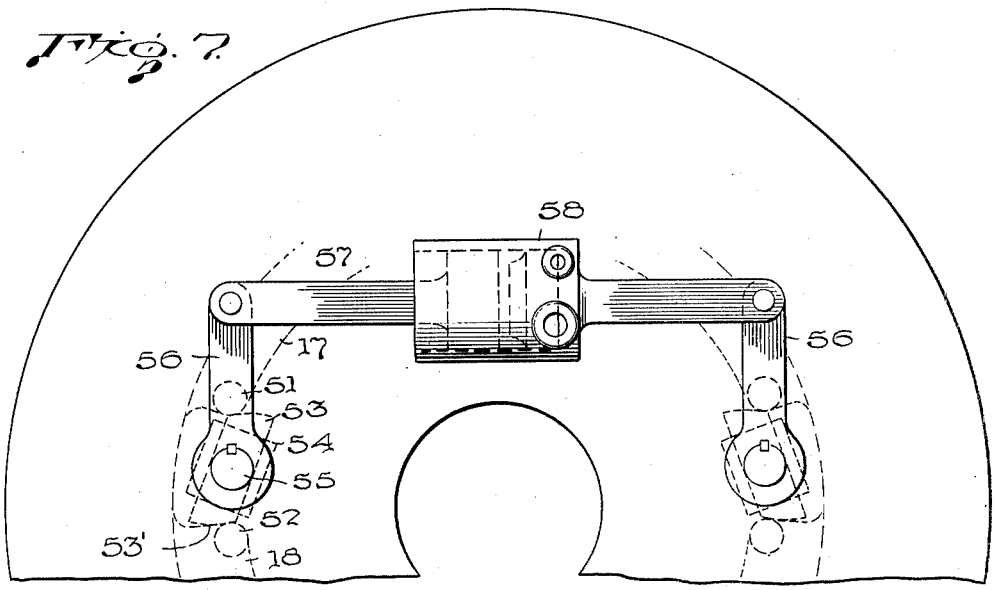
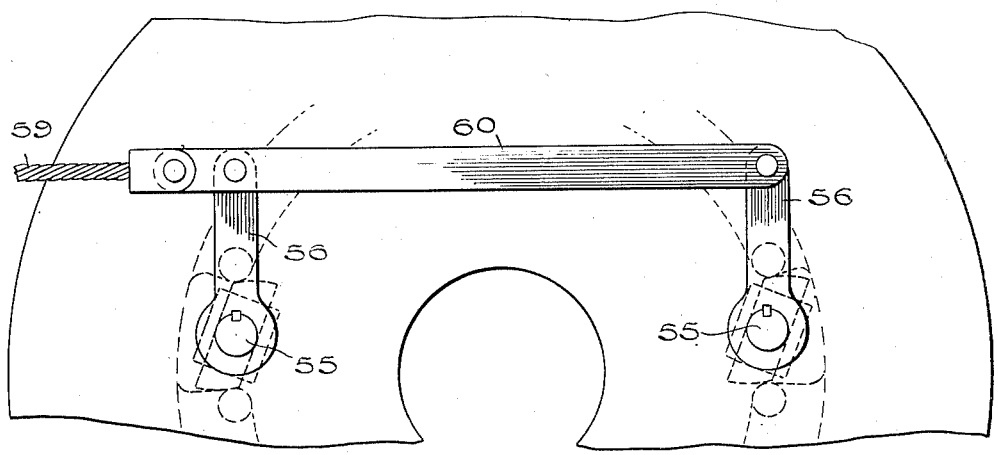
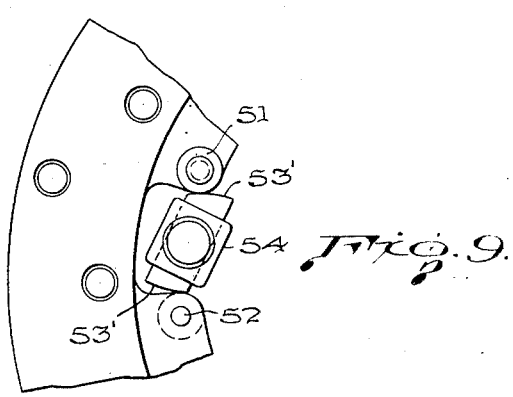
INVENTORS
H. T. LAMBERT
C. R. MYERS
BY
ATTORNEYS Patented June 5, 1951

2,555,651

UNITED STATES PATENT OFFICE 2,555,651

DISK BRAKE FOR AUTOMOTIVE VEHICLES

Homer T. Lambert, St. Joseph, and Claude R. Myers, Galien, Mich., assignors, by direct and mesne assignments, to Lambert Brake Corporation, St. Joseph, Mich., a corporation of Michigan Application April 13, 1948, Serial No. 20,648

10 Claims. (Cl. 188—72)

The present invention relates to improvements in automotive brakes, and in particular, to the disc type which are applicable to automobiles, trucks, buses, tractors and the like, and which in these applications may be operated hydraulically, mechanically or by air.

The invention has for its primary object the provision of a disc brake construction in which a pair of friction discs of ring form are mounted on fixed supporting means arranged inwardly of their braking surfaces, to thereby provide a relatively large and effective braking area at the peripheries of the discs.

A further object is to provide the braking discs with lugs or extensions arranged in pairs and between which actuating means is operably disposed so as to shift the lugs away from each other and thereby change the points of contact of the discs with their supporting means and initiate rotation of the discs and axial movements thereof for brake application.

Perhaps, one of the most important advantages of the present arrangement is ability to maintain what is known in the trade as "high pedal" operation. This is due to the fact that the actuating or braking discs only rotate very slightly to produce sufficient separation of the braking discs to bring them into contact with the rotating casing and obtain energization or braking power, whether the vehicle is moving forwardly or rearwardly. Any expansion of the elements due to the heat created is insufficient to allow the brake pedal to move any appreciable distance, thus eliminating one of the great faults of drum brakes where the movement of the pedal to the floor-board or stop is not unusual. This safety factor is of considerable importance, especially in connection with high speed or emergency stops of road vehicles.

Other and further objects and advantages of the invention will be hereinafter set forth and the novel features thereof defined by the appended claims.

In the drawings:

Figure 2 is a vertical sectional view through the braking device on the plane indicated by the line 2—2 of Figure 1;

Figure 7 is a diagrammatic view of a modified form of the invention showing more in detail the mounting camming means for effecting relative movement of one disc with respect to the other, the actuation of the cams being accomplished by an air cylinder;

Figure 8 is a similar view of a modified form of actuating means for the cams, or the substitution of a cable for the air cylinder; and Figure 9 is an enlarged sectional view of one of the cams and cooperating projections of the disc between which the camming member is disposed.

Figure 1:
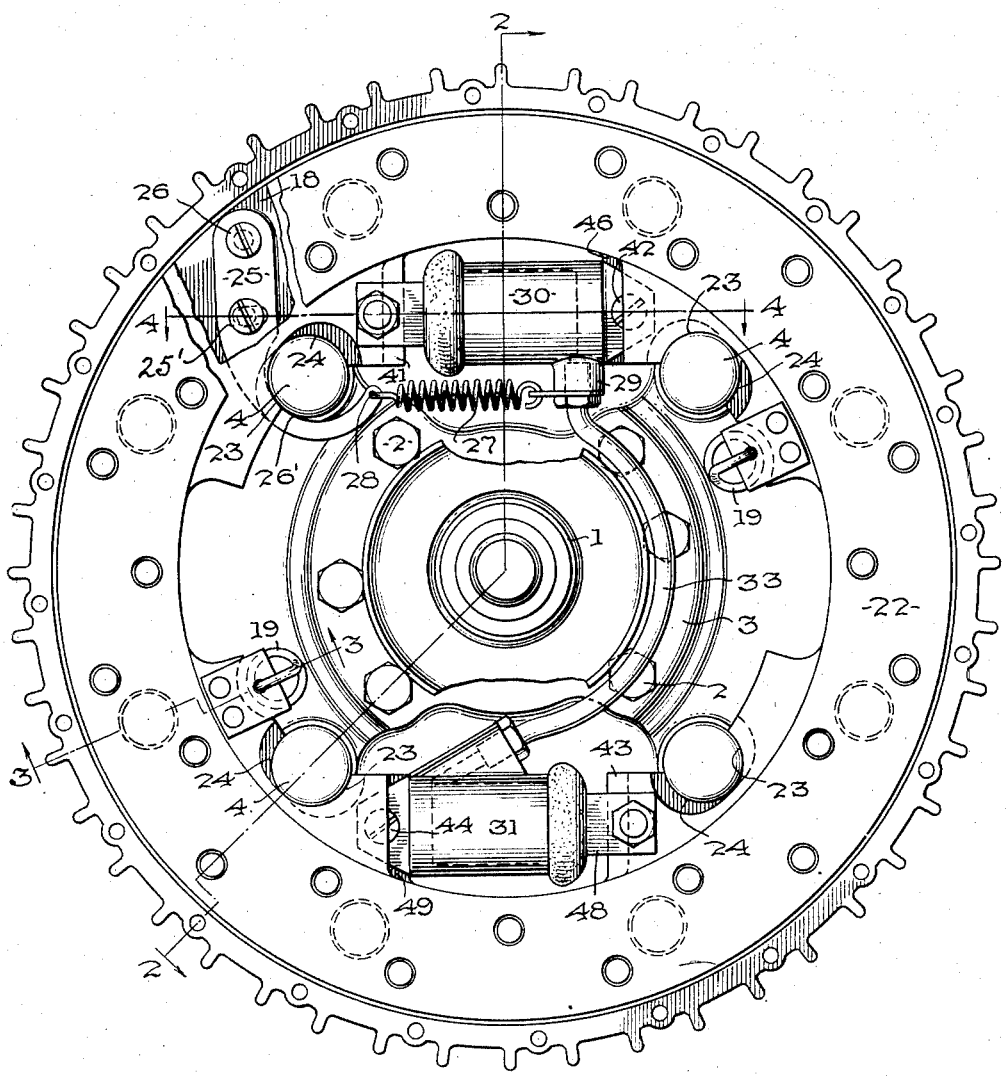
Figure 1 is a side elevation of a brake constructed in accordance with this invention with one side of the casing member removed to depict the details of the actuating brake unit mounted within the casing, parts of the near disc being broken away to show the mounting of a tension member employed to eliminate play or rattling of the actuating brake unit.

Specifically describing our invention and referring particularly to Figures 1 and 2 of the drawings, it will be understood that we have herein illustrated this brake mechanism as applied to the front wheel spindle of an automotive vehicle, and as hereinafter set forth, we describe this as the preferred form, the hydraulic type of actuation of the braking discs. However, we do not wish to be confined to the form illustrated, since this brake mechanism has a wide range of application, particularly in reference to the manner in which the relative rotation of the braking discs may be accomplished.

In the drawings, 1 designates the front wheel spindle of an automobile or other vehicle on which is mounted and secured by bolts 2 the supporting plate 3, carrying four equally-spaced studs designated 4, removably held in position on the said plate by means of the nuts 5 to form the main support for the relatively stationary braking and actuating disc unit assembly, later to be more specifically described. The periphery of the plate 3 is formed with a shoulder 6 closely cooperating with a similar shoulder 7 on the inner periphery of the outer revolving disc 8 which is provided with the inner friction surface 9.

Cooperating with this revolving disc 8 is a corresponding complemental outer revolving disc 10 having the inner friction surface 11 and secured to the wheel hub flange 12 by the bolts 13. These discs 8 and 10 are fastened together by the screws 13', so that they provide a casing unit within which the relatively stationary braking unit to be described is housed or enclosed. These discs, furthermore, are cast with external cooling fins 14, 15, so as to serve two purposes, namely, to act as a centrifugal fan when the vehicle is in motion, which fanning action provides for maximum dissipation of heat generated by the braking action, and secondly, to provide reinforcing ribs extending over and across the braking surfaces, so as to strengthen and prevent warping of these rotatable discs of the housing.

It will be obvious from the foregoing that this revoluble casing unit described, in conjunction with the stationary plate 3, provides a substantially completely closed housing and precludes entrance of foreign matter or splashing of water or mud into the casing, and at the same time enables ready separation of the parts to facilitate access to the braking members now to be described.

Figure 6:
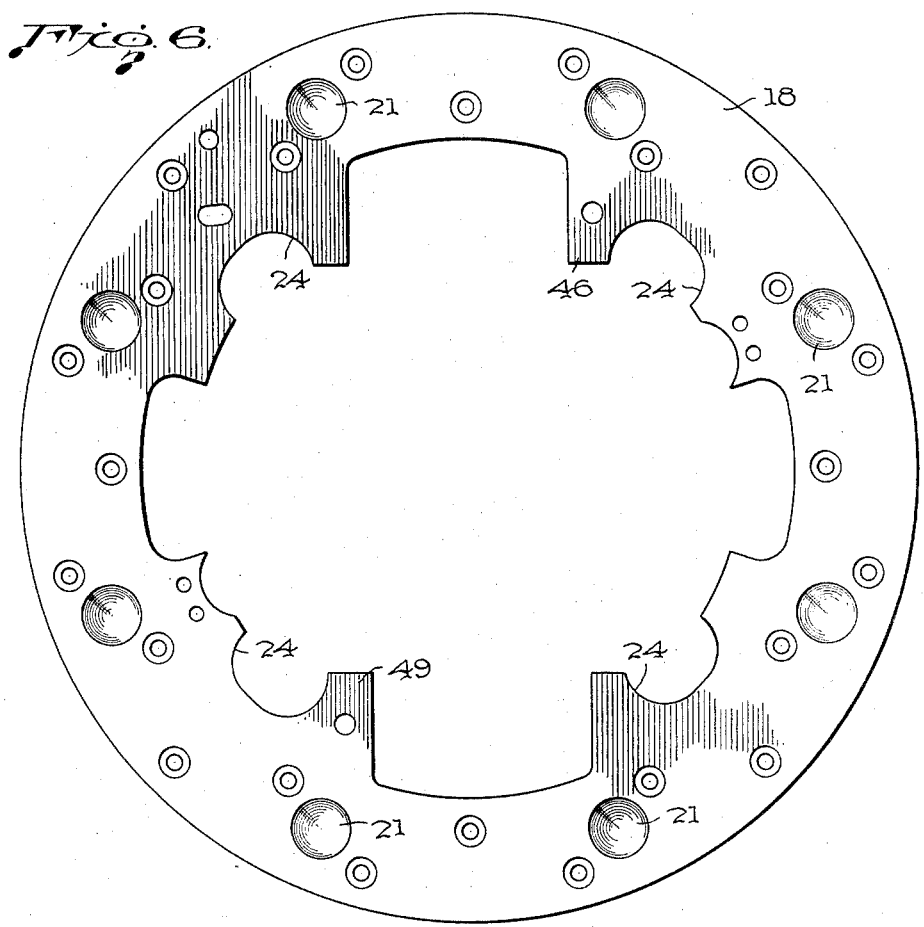
Figures 5 and 6 are elevational views of the respective outer and inner discs of the actuating brake unit, showing their similarity in general construction and arrangement of stud seats formed on the inner peripheries.
Figure 5:
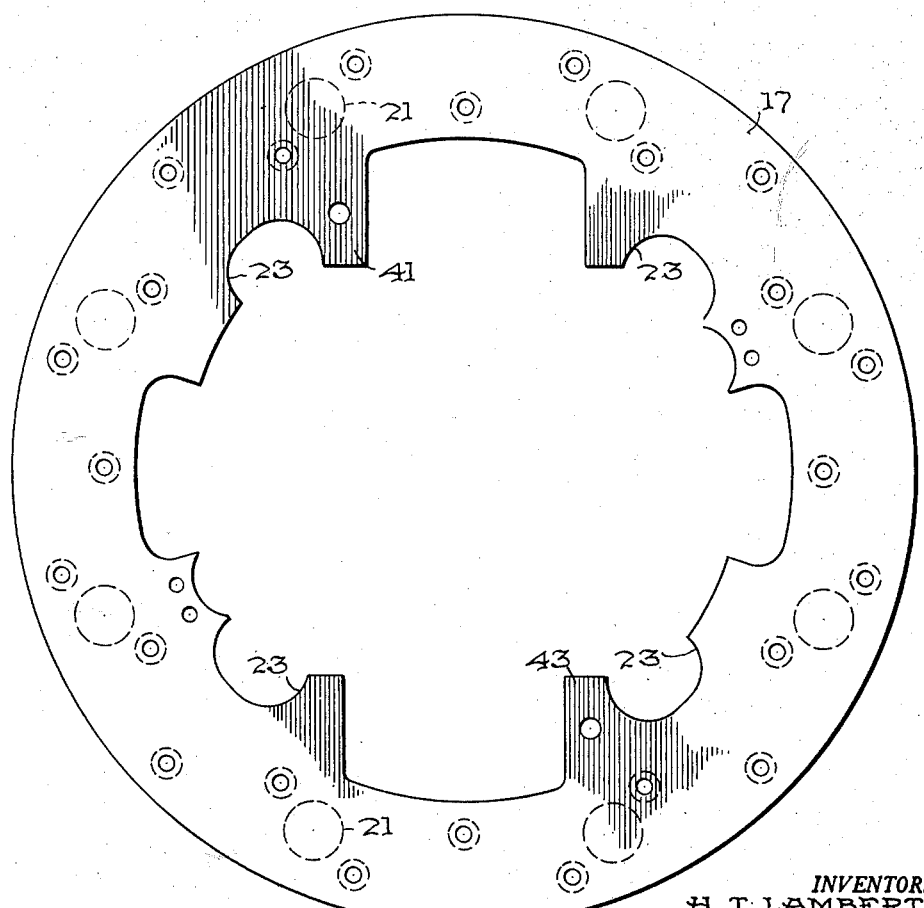

Within the housing referred to is mounted the braking unit assembly, generally designated by the reference numeral 16, and composed of two actuating discs or ring members 17, 18 which are substantially identical in form, as shown in Figures 5 and 6, but which are disposed back-to-back in the assembly of this independent unit of the brake. The position of the two discs in side-by-side relation is maintained normal by the strong coiled springs 19. These discs, however, are held slightly spaced from each other by the energizing members or balls 20 arranged equi-spaced around the discs in conical seats 21, so that the slightest rotative movement of one disc relative to the other will cause the moving disc ball seats to ride up on the balls 20. By this means these discs are caused to separate or shift axially in opposite directions so as to bring the friction surfaces or lining faces 22 attached to the outer face of each disc into contact with their associated friction surfaces 9 and 11, respectively.

When the vehicle is in motion, the rotation of the casing unit, as explained, continues the relative rotation of the moving braking disc referred to, thereby exerting a powerful braking pressure on the friction surfaces aforesaid.

In further detail, it will be noted that the braking unit assembly 16 is mounted upon the supporting studs 4 of the annular plate 3. These studs 4 not only constitute the supporting means for the assembly unit, but each stud acts as a stop to hold one of the discs 17, 18 against rotation while the other is permitted to rotate to initiate the servo action. To this end, each of the discs is formed about its inner periphery with elongated cutouts or notches, terminating in arcuate seats conforming substantially to the curvature of the surface of the studs. Thus, the seats in the normal position of the discs which receive the studs 4 are designated 23, on plate 17 while the corresponding seats for the disc 18 are designated 24, one of these seats 23 contacting at one side of a particular stud, and the other 24 contacting with the other side of the same stud.

From the above, it follows that rotary movement is stopped in one direction as far as one of these discs is concerned, and is stopped in the opposite direction as far as the other disc is concerned, speaking with reference to any brake application during the movement of the vehicle in one direction. However, when the vehicle is reversed this freedom of rotary movement of the discs is reversed from that just described. The opposite end of each cutout in each disc constitutes a relief, permitting shift of the discs independently of each other according to the requirements for braking and direction of travel of the vehicle.

The discs will always resume their normal positions when brake application is released because of the tension produced by the transverse springs 19. The seating of the intermediate balls 20 and the tension of these springs hold the discs firmly and highly tensioned toward each other in the axial direction of the discs, when there is no braking action, the seats 23 and 24 only lightly resting against the associated studs 4.

While this arrangement is entirely satisfactory when applied to tractors, in vehicles of the automobile type there may be a slight tendency for the braking unit assembly to rattle where there is no tension exerted upon this unit after brake application is released. To prevent such rattling, we mount a lever 25 between the discs 17 and 18 with an intermediate guide screw 25' upon a supporting member 26 extending from the inner face of one of the discs, in this instance the disc 18, and cause the arcuate edge 26' of the other end to bear against one side of the adjacent stud 4 by means of the spring 27 connected at one end to the lever at 28, and at its other end to a convenient point of a stationary part—in this instance to the inlet nipple 29 of the hydraulic cylinder 30. This spring prevents rattling or clicking of the unit under all operating conditions, except when the vehicle is reversed, at which time a slight click occurs as one of the discs shifts to seat against the studs 4 in functioning of brake application during such reverse movement of the vehicle.

Figure 4:
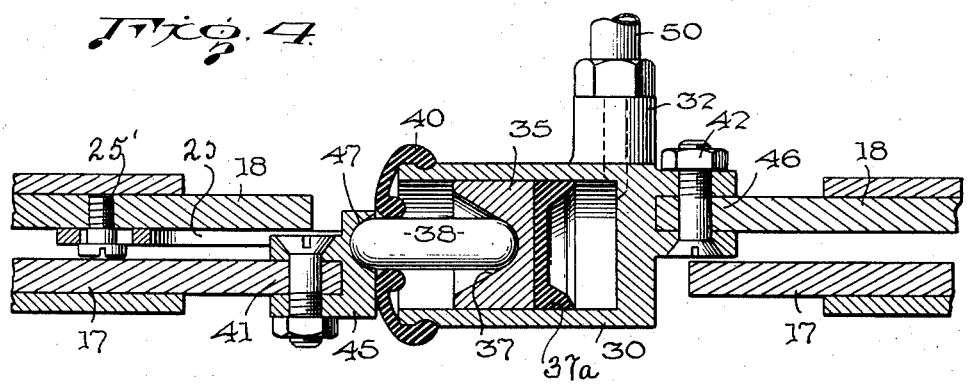
Figure 4 is an enlarged sectional view on the line 4—4 of Figure 1, showing more clearly the details of one of the hydraulic cylinders of the braking unit and its connections to the respective braking discs.

It is to be understood that relative rotary movement of the actutaing discs 17 and 18 may be produced by various means, and such movement may be caused by manual operation or otherwise as will be fully set forth hereinafter. In the preferred form, shown in Figures 1 and 2, we employ hydraulic means. For this purpose, the cylinders 30 and 31 are arranged in the braking unit assembly in diametrically opposed relation with respect to the axis of the brake, and these cylinders are adapted to receive the hydraulic medium through the inlet 32 from a conventional master cylinder (not shown), the fluid passing from cylinder 30 to cylinder 31 through the tube 33. At one side of the inlet 32 the cylinder fitting is provided with a bleed 34. Each of the cylinders carries a piston designated 35, one face of each being formed with a tapering plunger seat 37 to receive the inner end of its plunger 38, while the other face carries a pressure cup 37a of synthetic rubber or the like. Each cylinder is closed by a rubber seal 40, gripping the edge of the cylinder as shown most clearly in Figure 4, to keep out dust or dirt, and water.

The mounting of these cyilnders is an important feature of this invention. Both cylinders are mounted on the inner periphery of the disc 18, as shown in Figure 1; that is, the upper cylinder 30 is pivotally connected to the lug 46 on disc 18 by the bolt 42, and the lower cylinder 31 is similarly connected to the lug 49 on the disc 18 by bolt 44.

The disc 17 is provided with a socket 45, riveted or bolted to the lug 41 on said disc, said socket being formed with a plunger recess or seat 47 to receive the plunger 38, while a similar socket 48 is secured to the lug 43 of the disc 17 to receive the lower plunger of the cylinder 31.

Figure 3:
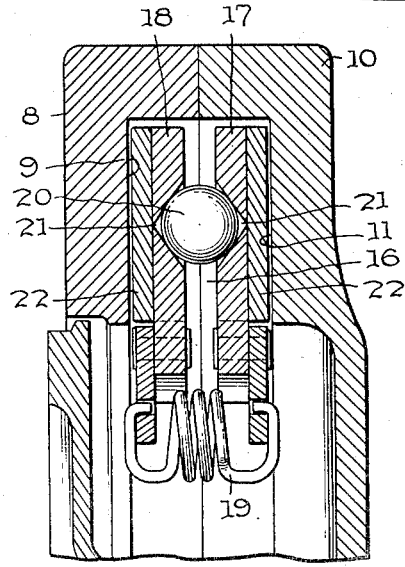
Figure 3 is an enlarged sectional view on the line 3—3 of Figure 1, showing more clearly the yieldable connecting means for the pair of actuating discs forming the braking unit of this construction.

The above will complete the assembly of the unit assembly, including the two actuating discs for mounting on the studs 4. Thus, when brake operation is to be produced, a slight touch on the foot pedal of the vehicle forces fluid through the supply tube 50 into the cylinder 30, and through tube 33 into cylinder 31. The piston plungers of these cylinders then tend to push the discs in opposite directions insofar as the reaction produced is concerned, but only one of the discs, the disc 18, is rotated counter-clockwise in one direction of movement of the vehicle, while disc 17 is held stationary against the studs 4 by the spring lever 25. In this action, the disc 17 would tend to move in a clockwise direction but for the arrangement of the studs and the provision of the lever 25. The reaction above referred to causes the conical surfaces of the ball seats in disc 18 to climb up on the balls 20, immediately spreading the discs 17 and 18 apart and into contact with the respective friction surfaces of the revolving casing, and thereby braking the movement of the vehicle. If the vehicle is reversed and brake application occurs, spring 25 permits both discs 17 and 18 to rotate slightly clockwise until disc 18 contacts with the studs 4, whereupon further rotation will cause disc 17 to effect energization as described above in connection with the brake operation during the forward movement of the vehicle. When brake pressure is released from the cylinders, the springs 19, which were distorted by relative movement of the discs 17, 18, will now cause the discs to resume their normal positions, thus pulling the discs inwardly toward each other and away from the revoluble casing walls. The energizing balls in this operation return to the original seating position, as clearly shown in Figure 3 of the drawings.

We have illustrated in Figures 7, 8 and 9 modifications of the brake construction above specifically set forth, and these will be clearly understood by the diagrammatic illustrations which omit any showing of the discs and the casing within which the actuating unit assembly is mounted. It is sufficient, in referring to Figure 7, to note that each of the discs 17 and 18 is provided with projections 51, 52 arranged in diametrically opposite positions. Between these projections we mount an elongated floating cam member 53 in a sleeve 54 splined on the transverse shaft 55 which extends outwardly of the casing of the brake construction. The cam member 53 has its end surfaces 53' curved or arcuate so that, when it is rotated by the shaft 55, these curved surfaces will coact with the respective projections 51 and 52 so as to move said projections away from each other. This action transmits rotary movement of one of the discs of the braking unit assembly relative to the other. The rotative movement of the cams, there being one of such elements at each side of the brake, is produced by the arms 56, one of which is connected to the piston 57, and the other to the cylinder 58. Air or other pressure fluid is admitted into this cylinder in the customary manner and the reaction of the piston and cylinder follows during brake application with the result described in reference to the preferred form employing the hydraulic cylinders 30, 31.

The cam constructions shown in Figure 7 may be manually or mechanically operated in a manner shown in Figure 8 by means of a cable 59 attached to a bar 60, which in turn is connected to the crank arms 56 mounted on the ends of the shafts 55.

In these different forms of the brake, the lining members are preferably attached to the discs so as to prevent the heat of friction in the braking action penetrating to the interior mechanisms or parts of the braking unit assembly.

While the specific details of construction have been herein shown and described, the invention is not confined thereto as changes and alterations may be made without departing from the spirit thereof as defined by the appended claims.

We claim:

1. Brake mechanism of the class described, comprising in combination a relatively stationary braking unit assembly composed of a pair of discs having annular friction surfaces, camming means intermediate said discs for holding the latter slightly spaced from each other, means for normally stressing the discs toward each other, supporting means for said unit cooperating with the inner peripheries of the discs, each disc having spaced seats on its periphery one of which coacts with one side of the supporting means while the other of which is spaced from the other side of said supporting means to provide a relief and permit limited rotation of the disc, revoluble means cooperating with said assembly and provided with inner friction surfaces, spaced lugs on said discs, and actuating means between said lugs for shifting said lugs away from each other to effect rotation of one disc relative to the other to thereby energize the camming means and effect spreading of the discs into braking application of the friction surfaces of said discs and revoluble means.

2. Braking means as set forth in claim 1, wherein the revoluble means comprises a closed casing surrounding the braking unit assembly.

3. Brake mechanism of the class described, comprising in combination a braking unit assembly composed of a pair of axially movable discs or ring members, each ring member being formed with a friction surface and a projecting lug, said lugs being located at points circumferentially spaced from each other, actuating means arranged between the lugs of said discs operable to separate the lugs and impart relative rotation to the discs, camming means between said discs operable upon such relative rotation to separate the discs, a support for said unit assembly including a plurality of spaced studs, the discs of said assembly having stud-receiving seats extending inwardly of the friction surfaces aforesaid with relief extensions thereof, said studs preventing rotation of one of the discs while allowing the other disc to rotate slightly relative thereto into the relief extension, and a rotary member to be braked disposed about the braking unit assembly and having friction surfaces for cooperation with the unit assembly friction surface upon separation of the disc during braking action.

4. Brake mechanism as set forth in claim 3, wherein the actuating means between the disc lugs consists of a hydraulic cylinder connected to one of the lugs and having a piston and plunger coacting with the other of said spaced lugs, and spring means for holding the discs together and restoring the discs to normal non-braking position after brake application.

5. Brake mechanism as set forth in claim 3, wherein the actuating means between the disc lugs consists of a rotatable cam member having arcuate faces coacting with the lugs of the discs for shifting the disc lugs apart and effecting rotary movement of one disc relative to the other.

6. Braking mechanism as set forth in claim 3, wherein one disc is formed with a pair of diametrically opposite lugs and the other disc is formed with a similar pair of diametrically opposite lugs spaced apart from the first pair, and the actuating means comprises hydraulic cylinders connected to one of each pair of lugs and pistons having plungers bearing against the other one of each pair of lugs.

7. Braking mechanism as set forth in claim 3, wherein one disc is formed with a pair of diametrically opposite lugs and the other disc is formed with diametrically opposite lugs spaced apart from the first pair, and the actuating means comprises rotatable camming arms and means for rotating said arms.

8. Braking mechanism as set forth in claim 3, wherein one disc is formed with a pair of diametrically opposite lugs and the other disc is formed with diametrically opposite lugs spaced apart from the first pair, and the actuating means comprises rotatable camming arms and fluid-operating means for rotating said arms.

9. Braking mechanism as set forth in claim 3, wherein one disc is formed with a pair of diametrically opposite lugs and the other disc is formed with diametrically opposite lugs spaced apart from the first pair, and the actuating means comprises rotatable camming arms and cable means for rotating said arms.

10. Brake mechanism of the class described, comprising in combination a braking unity assembly composed of a pair of braking discs having annular friction surfaces, means intermediate the discs for normally holding said discs slightly spaced apart, tension means for stressing said discs toward each other and against the spacing means aforesaid, a casing surrounding the unit assembly having inner friction surfaces and adapted for connection to the part to be braked, one side of said casing being formed with a central opening, a stationary supporting plate in said opening constituting a closure therefor, studs carried by said supporting plate and extending into said casing and through both discs of the braking unit assembly to support the latter, the discs of said unit assembly being axially shiftable relative to each other and to the supporting studs, and one of said discs being formed with arcuate seats slidably receiving the studs, means coacting with the studs and connected to the discs for normally preventing rattling of the discs when in brake release positions, and means for shifting the discs axially apart and causing the disc with said seats to slide on the studs until contact is made with the friction surfaces of the casing.

HOMER T. LAMBERT.
CLAUDE R. MYERS.

REFERENCES CITED

The following references are of record in the file of this patent:

UNITED STATES PATENTS

| Number | Name | Date |
|---|---|---|
| 1,696,879 | Chase | Dec. 25, 1928 |
| 2,278,144 | Milan | Mar. 31, 1942 |
| 2,307,652 | Whitten | Jan. 5, 1943 |
| 2,387,039 | Parrett | Oct. 16, 1943 |

FOREIGN PATENTS

| Number | Country | Date |
|---|---|---|
| 872,627 | France | June 15, 1942 |